United States Patent
Ady

[15] 3,643,162

[45] Feb. 15, 1972

[54] TRANSMITTER PRODUCING IN RECURRENT CYCLES TIME-SPACED VARIED-POWER PROPAGATABLE PULSELIKE SIGNALS

[72] Inventor: Roger R. Ady, 13945 Alibhai St., Beaverton, Oreg. 97005

[22] Filed: July 7, 1969

[21] Appl. No.: 839,411

[52] U.S. Cl. ....................325/164, 325/105, 325/111, 325/115, 325/141, 325/161, 325/169, 325/185, 325/186, 325/187, 331/106, 328/53

[51] Int. Cl. ....................H04b 1/04

[58] Field of Search ....................325/115, 116, 141, 161, 164, 325/666, 169, 101, 111, 113–118, 166, 144, 182, 185–187, 105, 152; 330/127; 331/172–174, 47; 340/206, 224; 343/17.1, 102, 107; 332/9, 10, 14, 15, 59

[56] References Cited

UNITED STATES PATENTS

| | | | |
|---|---|---|---|
| 3,100,283 | 8/1963 | Makow | 325/105 |
| 3,132,301 | 5/1964 | Siderman et al. | 340/206 |
| 3,299,356 | 1/1967 | Bornhorst et al. | 325/164 |
| 3,436,754 | 4/1969 | Powner | 325/161 |

*Primary Examiner*—Robert L. Richardson
*Assistant Examiner*—Albert J. Mayer
*Attorney*—Kolisch & Hartwell

[57] ABSTRACT

A transmitter which, when energized, transmits in recurrent cycles multiple time-spaced pulselike signals, with different signals in a cycle having different maximum power levels.

18 Claims, 3 Drawing Figures

INVENTOR.
ROGER R. ADY
BY Kolisch & Hartwell
ATTORNEYS

PATENTED FEB 15 1972

3,643,162

INVENTOR.
ROGER R. ADY

BY Kolisch & Hartwell

ATTORNEYS

TRANSMITTER PRODUCING IN RECURRENT CYCLES TIME-SPACED VARIED-POWER PROPAGATABLE PULSELIKE SIGNALS

This invention pertains to search-assist apparatus of the kind which, for example, may be employed to guide a searcher to the location of a lost person or piece of equipment. More particularly, it pertains to a transmitter for use in such apparatus. For the purpose of illustration herein, an embodiment of the invention is described in conjunction with locating a downed aircraft.

Conventional search-assist apparatus typically includes some type of portable radio transmitter which is carried by a person or attached to a particular piece of equipment. The transmitter is adapted to be powered by an accompanying source, such as a battery. The transmitter may be energized either manually (locally or remotely), or automatically on the occurrence of some event. When energized, the transmitter transmits a signal—usually a continuous-type signal—so long as adequate battery power is available. With the transmitter operating, establishing the location thereof (and hence of the person or equipment) normally is accomplished by well-known triangulation techniques utilizing conventional radio direction-finding equipment.

Such apparatus and procedures, however, are characterized by a number of drawbacks. To begin with, radio direction-finding equipment is highly specialized, costly, and relatively scarce. Thus, it may not always be readily available, and in particular, may not be obtainable within the limited time that a particular transmitter (of the type so far mentioned) is operating. An additional problem is that a conventional triangulation operation employing such equipment is relatively time consuming. Further, where a transmitter transmits continuous signals, it may consume available battery power so quickly that transmission stops before a searcher has progressed very far in his search.

A general object of the present invention, therefore, is to provide a novel search-assist transmitter which takes care of the drawbacks mentioned above in a practical and satisfactory manner.

More specifically, an object of the invention is to provide such a transmitter which obviates the need for costly direction-finding equipment of the type which has heretofore been required.

A related object is to provide such a transmitter which is constructed to produce signals that are receivable in widely available, relatively low-cost conventional receiver apparatus, and which themselves function to guide a searcher toward the site of the transmitter.

Another object of the present invention is to provide a transmitter of the type generally indicated which is constructed to be energized by a portable power source, such as a batter, and which, when energized, makes conservative use of source power.

Still a further object of the invention is to provide a transmitter of the type indicated so far which is relatively simple and compact in construction.

According to a preferred embodiment of the invention, the transmitter comprises a radiofrequency generator, and circuitry for supplying in recurrent cycles multiple time-spaced varied-power pulses from a battery (or similar source) to the generator. Each pulse of power supplied the generator is modulated at an audio rate. The generator when energized produces a radiofrequency wave having a maximum power level related to the amount of power supplied the generator. The frequency of the wave is selected to be one that is readily receivable in conventional widely used receivers. In the particular embodiment described herein, the transmitter frequency chosen is the established distress signaling frequency assigned for aircraft—receivable in substantially all aircraft receivers. The generator supplies an antenna, in recurrent cycles, with multiple time-spaced varied-power pulselike signals (audio-modulated radiofrequency waves) which the antenna in turn radiates.

Each cycle of the particular transmitter described herein contains four signals of the type just mentioned. The first two signals in a cycle have substantially the same maximum power level; the third signal has a somewhat lower maximum power level; and the fourth signal has yet a lower maximum power level.

With such construction, several important advantages are obtained. Because transmission is in the form of time-spaced signals (such signals being separated by periods of nontransmission), the proposed transmitter conserves battery (source) power.

Further, with the multiple signals in a cycle having different maximum power levels, the need for costly direction-finding equipment of the type required heretofore is eliminated. More specifically, the signals in a cycle having different maximum power levels tend to radiate to different distances from the transmitter. Generally speaking, the higher the power level of a signal, the greater the distance to which it radiates. With this the case, and with the signals receivable in a conventional receiver, such a receiver may readily be employed to guide one from a distant location (where only the first two signals in a cycle are detected), to a location closely adjacent the transmitter (where all signals in a cycle are detected). Thus, the signals produced by the proposed transmitter are effective to guide a searcher to the location of the transmitter.

Audio modulation of the power pulses supplied the generator results in modulation at an audio rate of the radiated signals, Such modulation aids in identification of the signals.

These and other objects and advantages attained by the invention will become more fully apparent as the description which follows is read in conjunction with the accompanying drawings, wherein.

Figure 1:
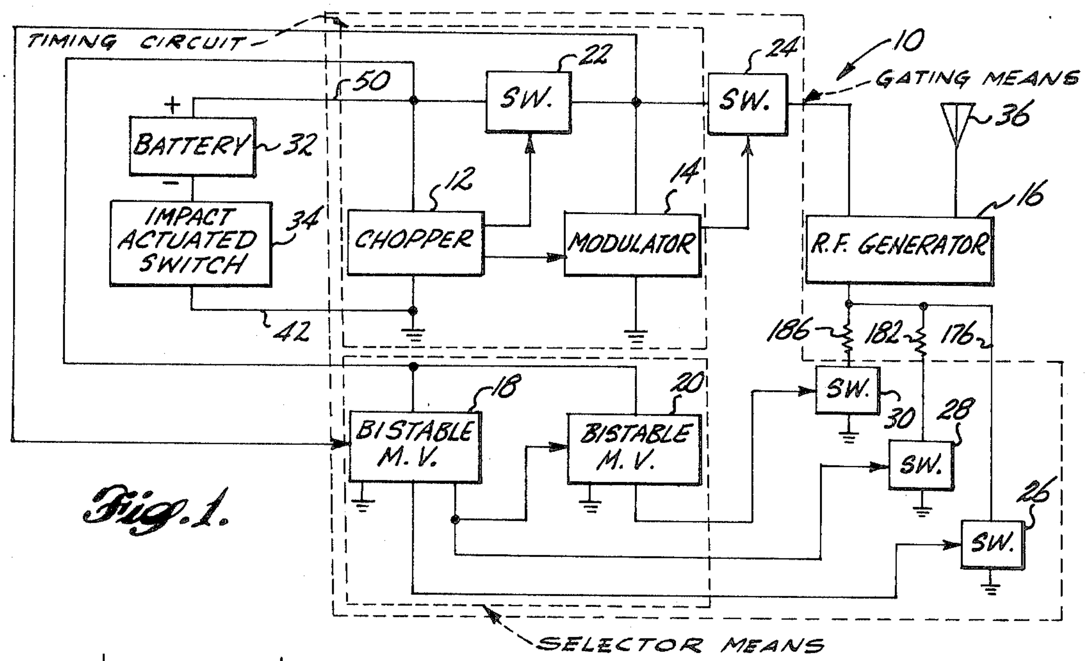
FIG. 1 is a schematic diagram, partly in block form, illustrating a transmitter constructed according to the invention.

Turning now to the drawings and referring first to FIG. 1, indicated generally at 10 is a transmitter constructed according to the invention. The particular transmitter shown is adapted to be used in conjunction with an aircraft. In general terms, transmitter 10 includes a chopper 12, a modulator 14, a radiofrequency generator 16, and a pair of bistable multivibrators 18, 20. The transmitter also includes a plurality of electronic switches indicated at 22, 24, 26, 28, 30. Chopper 12, modulator 14, multivibrators 18, 20, and the various switches just mentioned along with circuit components associated with these switches together constitute a gating means herein. Further, these components, in combination with generator 16, are referred to as a signal producer.

Power is supplied the transmitter through a battery 32 and an impact-actuated switching circuit 34. Output signals from the transmitter are supplied to a conventional antenna, or propagating means, 36.

Figure 2:
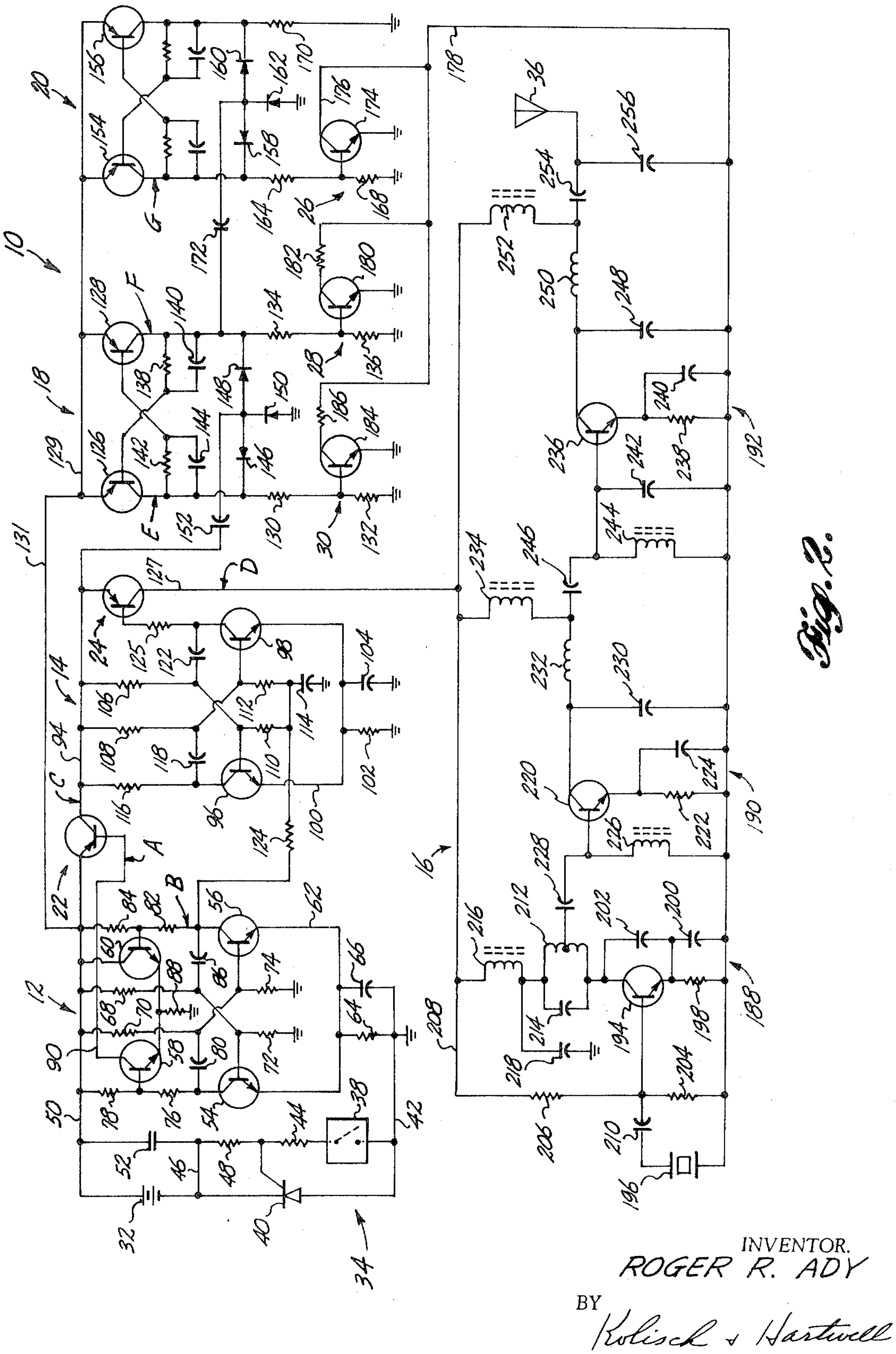
FIG. 2 is a circuit diagram further illustrating the transmitter of FIG. 1.

Referring to FIG. 2, switching circuit 34 includes a normally open impact-actuated switching unit 38 and a silicon-controlled rectifier 40. Unit 38 is a conventional unit which includes a switch that closes momentarily on impact to the unit. One side of unit 38 is connected to one of the power-input terminals, conductor 42, of the transmitter, and the other side of the unit is connected to the gate of rectifier 40 through a resistor 44. Conductor 42 is grounded. The anode of the rectifier also is connected to terminal 42. The cathode of rectifier 40 is connected to the negative side of battery 32, and in addition, is connected to the gate of the rectifier through a conductor 46 and a resistor 48. The positive side of the battery is connected to the other power-input terminal, conductor 50, of the transmitter. A capacitor 52 is connected across the battery.

Prior to closing of the switch in unit 38, rectifier 40 is nonconductive. On an impact occurring to the unit, its switch closes momentarily, places a voltage pulse on the gate of the rectifier, and causes the rectifier to become and remain conductive. With conduction of rectifier 40, substantially the full voltage of battery 32 is applied between conductors 50, 42.

Chopper 12 includes transistors 54, 56, 58, 60. Transistors 54, 56 have their emitters interconnected by a conductor 62 which is connected to ground through a resistor 64 and a capacitor 66. The bases of transistors 54, 56 are connected to conductor 50 through resistors 68, 70, respectively, and are connected to ground through resistors 72, 74, respectively. The collector of transistor 54 is connected to conductor 50 through resistors 76, 78, and is connected to the base of transistor 56 through a capacitor 80. Similarly, the collector of transistor 56 is connected to conductor 50 through resistors 82, 84, and to the base of transistor 54 through a capacitor 86. The capacitance of capacitor 80 is about 10 times that of capacitor 86.

The emitters of transistors 58, 60 are connected together as shown, and are connected to ground through a resistor 88. The base of transistor 58 is connected to the junction between resistors 76, 78. The base of transistor 60 is connected to the junction between resistors 82, 84. The collector of transistor 58 is connected to a conductor 90, and the collector of transistor 60 is connected to conductor 50.

Figure 3:
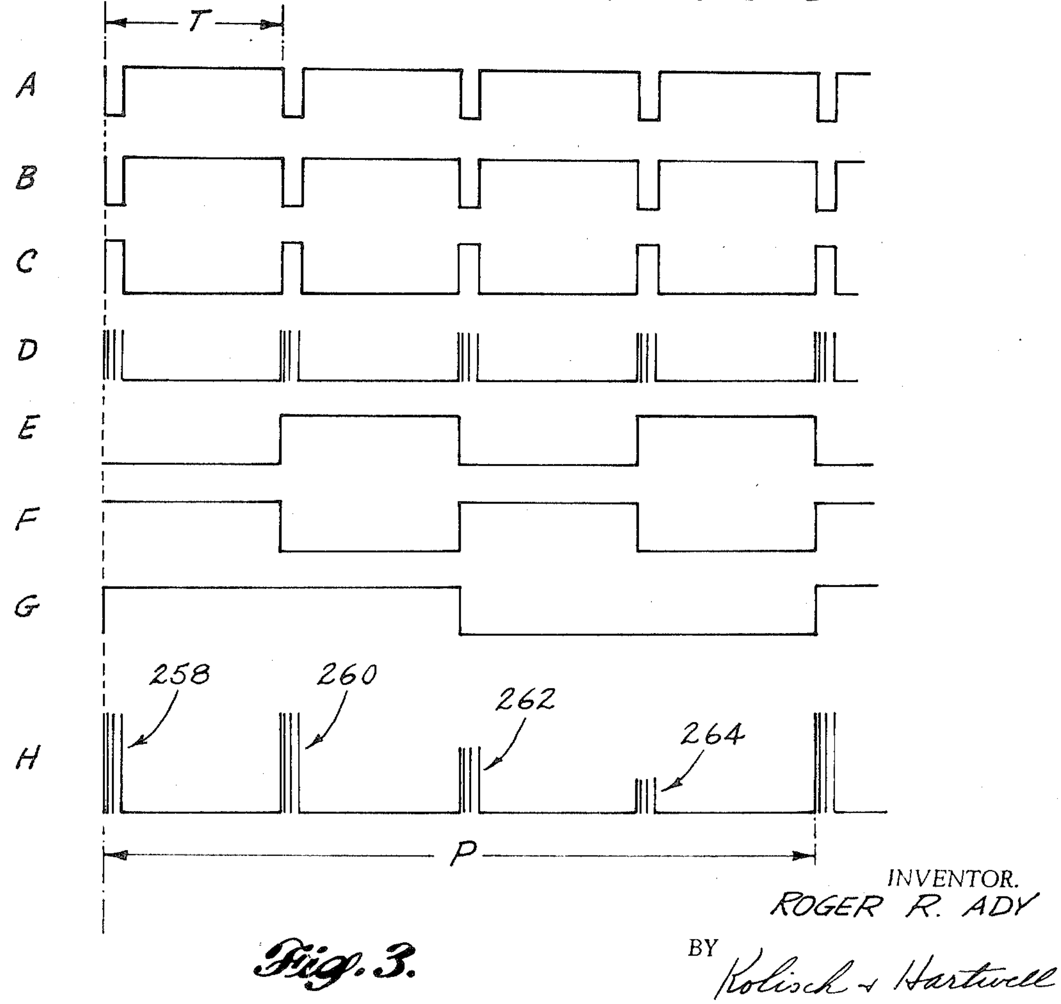
FIG. 3 illustrates in simplified graphic form, and on a common time scale, representations of voltages which exist at various points in the circuit of FIG. 2, and of output signals which are radiated from an antenna in the circuit.

With voltage from battery 32 applied between conductors 50, 42, the chopper provides at points A (on conductor 90), B (on the collector of transistor 56) voltages having the waveforms indicated at A, B, respectively, in FIG. 3. Voltage A has a rectangular waveform, with a period, indicated at T, of about 3 seconds. During each period of voltage A, the level thereof is at a low potential (below the battery voltage) for about the first 10 percent of the period (about one-third of a second), and for the balance of the period is positive at substantially the potential of battery 32. Voltage B is similar, and matched in time, to voltage A.

Switch 22 takes the form of a transistor having its emitter connected to conductor 50, and its base connected to conductor 90. The collector, or output side, of this transistor is connected to a conductor 94. With battery voltage applied between conductors 50, 42, and chopper 12 operating, switch 22 operates as an inverter with respect to voltage A. More specifically, switch 22 applies at point C (to conductor 94) a voltage having the waveform indicated at C in FIG. 3. The period of voltage C is the same as that of voltages A, B. The level of voltage C is about at ground potential for 90 percent of each period, and for the balance of the period (about one-third of a second) is positive at substantially the potential of the battery.

Modulator 14 includes a pair of transistors 96, 98. The emitters of these transistors are interconnected through a conductor 100 which is connected to ground through a resistor 102 and a capacitor 104. The bases of transistors 96, 98 are connected to conductor 94 through resistors 106, 108, respectively, and are connected to ground through resistors 110, 112, respectively, and a capacitor 114. The collector of transistor 96 is connected to conductor 94 through a resistor 116, and is connected to the base of transistor 98 through a capacitor 118. The collector of transistor 98 is connected to the base of transistor 96 through a capacitor 122. Capacitors 118, 122 have substantially the same capacitances. The junction between capacitor 114 and resistors 110, 112 is connected to the collector of transistor 56 through a resistor 124.

Chopper 12, modulator 14 and switch 22 constitute a timing circuit herein.

Switch 24 takes the form of a transistor having its emitter connected to conductor 94 and its base connected through a resistor 125 to the collector of transistor 98. The collector of the transistor forming switch 24 is connected to a conductor 127.

With each application of positive voltage to conductor 94, modulator 14 becomes energized. When energized, the modulator produces on the collector of transistor 98 rectangular-wave pulses at an audio rate. It will be recalled that an application of positive voltage to conductor 94 occurs once every three seconds (for a time interval of about one-third of a second) by virtue of the application of voltage C to conductor 94.

The exact frequency of such audio pulses depends, to some extent, upon the voltage across capacitor 114. Further explaining, within a certain voltage range, the higher the voltage across this capacitor, the higher the audiofrequency of the pulses. It will be noted from an examination of FIG. 3, that each time the voltage on conductor 94 (voltage C) shifts positively from a ground potential, the voltage supplied capacitor 114 through resistor 124 (voltage B) shifts in the opposite direction. As a consequence, during each interval that positive voltage is applied to conductor 94, the voltage across capacitor 114 decreases gradually. This type operation results in the frequency of the audio pulses mentioned decreasing during each interval that modulator 14 is energized. In the embodiment illustrated, the frequency or rate of such pulses at the beginning of each interval is about 1,000 cycles per second, and at the end of each interval is about 600 cycles per second.

Capacitor 114 and resistor 124 together constitute a rate-changing circuit herein.

Explaining the operation of switch 24, with each application of positive voltage to conductor 94, the transistor forming the switch produces at its collector and on conductor 127 a voltage wave form such as that represented at D in FIG. 3. Voltage D comprises a series of time-spaced groupings of positive audiofrequency rectangular-wave pulses. These pulses correspond in time to those produced on the collector of transistor 98. In order to simplify FIG. 3, the audio pulses that occur during such spaced-apart groupings are represented therein simply by several vertical lines. It will be noted that in each grouping of such lines, the lines are closely spaced adjacent the left side of the grouping, and are more widely spaced adjacent the right side of the grouping. This is to reflect the decrease in audiofrequency, mentioned earlier, which occurs in the pulses.

Turning now to multivibrators 18, 20, also referred to herein as selector means, these are similar in construction. Multivibrator 18 includes a pair of transistors 126, 128. The emitters of these transistors are connected through conductors 129, 131 to conductor 50. The collectors of transistors 126, 128 are connected to ground through resistors 130, 132, and 134, 136, respectively. These collectors constitute outputs for multivibrator 18. The base of transistor 126 is connected to the collector of transistor 128 through the parallel combination of a resistor 138 and a capacitor 140. Similarly, the base of transistor 128 is connected to the collector of transistor 126 through a resistor 142 and a capacitor 144 which are connected in parallel.

Also included in multivibrator 18 are diodes 146, 148, 150, and a capacitor 152. The anodes of diodes 146, 148 are connected together and the cathodes are connected to the collectors of transistors 126, 128, respectively. The anode of diode 150 is grounded, and the cathode is connected to the anodes of the other two diodes. Capacitor 152 couples the junction between the anodes of diodes 146, 148 and the cathode of diode 150 to conductor 94. The junction just mentioned constitutes an input for multivibrator 18.

Multivibrator 20 includes transistors 154, 156 which correspond to transistors 126, 128, respectively, in multivibrator 18, and diodes 158, 160, 162 which correspond to diodes 146, 148, 150, respectively. The other components and interconnections in multivibrator 20 are similar to those in multivibrator 18, except that whereas the collector of transistor 154 is connected to ground through a pair of resistors 164, 168 which correspond to resistors 130, 132, respectively, the collector of transistor 156 is connected to ground through a single resistor 170. A capacitor 172 connects the collector of transistor 128 to the junction between the anodes of diodes 158, 160 and the cathode of diode 162.

With battery voltage applied between conductors 50, 42, and hence between conductor 129 and ground, multivibrators 18, 20 become energized. Considering the operation of multivibrator 18, each time the voltage on conductor 94 changes positively from ground potential, transistors 126, 128 change their respective operating states in a well-known fashion. Whichever transistor is conductive at the time of such a voltage change becomes nonconductive, and the reverse occurs for the other transistor. With voltage C present on conductor 94, the voltages produced at the collectors of transistors 126, 128 are as represented at E, F, respectively, in FIG. 3. Voltages E, F, which are the inverse of one another, are square wave voltages whose levels switch between about ground potential and the full positive voltage of battery 32. The periods of these voltages are the same, and are about 6 seconds.

Explaining how multivibrator 20 operates, each time the voltage on the collector of transistor 128 switches positively from ground potential, transistors 154, 156 change their respective operating states. With the voltage on the collector of transistor 128 as represented at F in FIG. 3, the voltage produced on the collector of transistor 154 is as represented at G in FIG. 3. Like voltages E, F, voltage G also is a square wave voltage that switches between about ground potential and the full positive voltage of battery 32. The period of voltage G is about 12 seconds.

Considering now switches 26, 28, 30, switch 26 includes a transistor, or switch device, 174 having its emitter grounded and its base connected to the junction between resistors 164, 168. The collector of the transistor is connected through a conductor 176 to a conductor 178. Conductor 176, also referred to herein as a resistance unit, has a relatively small resistance value. The voltage applied to the base of transistor 174 is similar in waveform to, but lower in potential than, that which occurs on the collector of transistor 154. Each time this voltage is positive relative to ground, transistor 174 is placed in a conductive or closed state.

Switch 28 includes a transistor, or switch device, 180 having its emitter grounded and its base connected to the junction between resistors 134, 136. The collector of transistor 180 is connected to conductor 178 through a resistor, or resistance unit, 182. The resistance valve of resistor 182 is greater than that of conductor 176. The voltage applied to the base of transistor 180 is substantially that which occurs on the collector of transistor 128. When this voltage is positive relative to ground transistor 180 is placed in a conductive or closed state.

Switch 30 is similar to switch 28, and includes a transistor 184 having its emitter grounded and its base connected to the junction between resistors 130, 132. The collector of transistor 184 is connected to conductor 178 through a resistor, or resistance unit, 186. Resistor 186 has a resistance valve which is greater than that of resistor 182. The voltage applied to the base of transistor 184 is substantially that which exists on the collector of transistor 126. When this voltage is positive relative to ground, transistor 184 is placed in a conductive or closed state.

Multivibrators 18, 20, and switches 26, 28, 30 (together with the components described in conjunction with these switches, including conductor 176 and resistors 182, 186) constitute a resistance-adjusting circuit in the gating means previously mentioned. The left side of capacitor 152 in FIG. 2, constitutes an input terminal for this circuit.

Radiofrequency generator 16 is conventional in design, and in general terms, includes an oscillator 188, a buffer amplifier 190, and a power amplifier 192.

Oscillator 188 includes a transistor 194 and a frequency-controlling crystal 196. The emitter of transistor 194 is connected to previously mentioned conductor 178 through the parallel combination of a resistor 198 and a capacitor 200. In addition, the emitter is connected to the collector of the transistor through a capacitor 202. The base of the transistor is connected to conductor 178 through a resistor 204, and is connected to previously mentioned conductor 127 through a resistor 206 and a conductor 208. Crystal 196, in series with a coupling capacitor 210, is connected across resistor 204. The collector of transistor 194 is connected to conductor 208 through the parallel combination of an inductor 212 and a capacitor 214, in series with an inductor 216. The bottom side of inductor 216 in FIG. 2 is bypassed to ground through a capacitor 218.

Buffer amplifier 190 includes a transistor 220 having its emitter connected to conductor 178 through the parallel combination of a resistor 222 and a capacitor 224. The base of the transistor is connected to conductor 178 through an inductor 226, and in addition, is connected to the winding of inductor 212 (intermediate the opposite ends of such winding) through a coupling capacitor 228. The collector of transistor 220 is connected to conductor 178 through a capacitor 230, and is connected to conductor 208 through a pair of inductors 232, 234.

Power amplifier 192 includes a transistor 236 having its emitter connected to conductor 178 through a resistor 238, and a capacitor 240 which is in parallel with this resistor. The base of the transistor is connected to conductor 178 through the parallel combination of a capacitor 242 and an inductor 244. In addition, the base of transistor 236 is connected to the junction between inductors 232, 234 through a coupling capacitor 246. The collector of transistor 236 is connected to conductor 178 through a capacitor 248, and is connected to conductor 208 through a pair of inductors 250, 252.

Previously mentioned antenna 36 is connected through a capacitor 254 to the junction between inductors 250, 252, and is connected to conductor 178 through a capacitor 256.

With power supplied generator 16 (through the application of voltage between conductors 208, 178 with the former positive relative to the latter), the generator produces radiofrequency waves which are supplied to antenna 36. The frequency of such waves is controlled by crystal 196, and in the embodiment illustrated is about 121.5 megacycles. This frequency is one which has been assigned as an emergency or distress signaling frequency for use particularly in conjunction with aircraft. Waves produced by the generator and supplied to the antenna are radiated or propagated by the latter in a well-known fashion.

Explaining now how the transmitter described herein operates as a whole, with momentary closing of the switch in unit 38, chopper 12, modulator 14, multivibrators 18, 20, and switches 22, 24, 26, 28, 30 operate in the manners already described. Generator 16 is energized whenever, simultaneously, positive voltage from conductor 127 is applied to conductor 208, and conductor 178 is connected (through transistors 174, 180 or 184) to ground. The level of power supplied the generator at a given time depends upon the amount of current flowing through it from conductor 127 to conductor 178. With the voltage on conductor 127 that represented at D in FIG. 3, and grounding of conductor 178 controlled by transistors 174, 180, 184 in response to voltages G, F, E, respectively, generator 16 is energized (at an audio-modulated rate) every 3 seconds during an interval that lasts about one-third of a second. The output signals radiated as a consequence by antenna 36 are represented generally at H in FIG. 3, with the relative amplitudes of the signals as shown in the figure reflecting their relative maximum power levels.

More specifically, on transistor 174 in the gating means switching to a conductive state (such action resulting from the level of voltage G switching from ground potential to the positive value mentioned earlier), conductor 178 is connected to ground through conductor 176 and transistor 174. This is a relatively low resistance path, and as a consequence, it permits a relatively high current to flow through the generator from conductor 127. Transistor 174 is held in this state continuously for about 6 seconds. Conduction of transistors 180, 184 during conduction of transistor 174 has no appreciable effect on the amount of current permitted to flow through the generator. This is because, in the case of conduction of each of these two transistors, a relatively high resistance path is introduced between conductor 178 and ground (due to the presence of resistors 182, 186).

During conduction of transistor 174, two time-spaced audio-modulated groupings of voltage pulses (of voltage D) are applied to conductor 127, and hence to conductor 208. During each such grouping of voltage pulses, the generator is energized in a manner which follows the pulses in the grouping. These two groupings of voltage pulses result in generator 16 supplying antenna 36 with two groupings (spaced similarly in time) of audio-modulated radiofrequency pulses, such as those indicated generally at 258, 260 in FIG. 3. These pulse groupings (258, 260) are also referred to herein as pulselike signals. The maximum power levels of signals 258, 260 are substantially the same. Preferably, this power level is about 500 milliwatts.

With transistor 174 switched subsequently to a nonconductive state, transistor 180 in the gating means is switched to a conductive state (under the control of voltage F) for an interval of about 3 seconds. Transistor 184 is nonconductive during such interval. Conductor 178 is thereupon connected to ground through resistor 182 and transistor 180. This presents a somewhat higher resistance path between conductor 178 and ground (than was present in the situation just previously described). As a consequence, and with all other things being substantially equal, a lesser amount of current flows through the generator. During such conduction of transistor 180, a single grouping of voltage pluses D is applied to conductor 208—such grouping being the one next following the last grouping applied with transistor 174 conducting. The pulses in this one grouping energize the generator in much the same manner just described, except at a lower maximum power level. As a consequence, the generator supplies antenna 36 with a signal such as that indicated at 262. The maximum power level of this signal preferably is about 150 milliwatts.

On transistor 180 subsequently returning to a nonconductive state, transistor 184 in the gating means switches to a conductive state (under the control of voltage E) for an interval of about 3 seconds. Thereupon, conductor 178 is connected to ground through resistor 186 and transistor 184. Because resistor 186 has a higher resistance value than that of resistor 182, and with all other things being substantially equal, the amount of current permitted to flow through the generator is less than that which is permitted with transistor 180 alone conducting. During such conduction of transistor 184, a single grouping of voltage pulses D is applied to conductor 208 (such grouping being the one next following the grouping just described in conjunction with conduction of transistor 180). The pulses in this grouping energize the generator in much the same manner as described already, except at a still lower power level. As a consequence, the generator supplies antenna 36 with a signal such as that indicated at 264 in FIG. 3. The maximum power level of this signal preferably is about 25 milliwatts.

Following such conduction of transistor 184, the same returns to a nonconductive state, and transistor 174 switches again to a conductive state. The same operation just described then repeats, and continues to repeat as long as adequate battery power is available.

A set of four time-spaced signals, such as signals 258, 260, 262, 264 define an operating cycle of the transmitter, such cycle having a period (indicated at P in FIG. 3) of about 12 seconds. With the maximum power levels indicated, signals such as signals 258, 260 are detectable up to a distance of about 50 miles from the transmitter, signals such as signal 262 are detectable up to a distance of about 25 miles, and signals such as signal 264 are detectable up to a distance of about 10 miles.

When used in conjunction with an aircraft, the transmitter is mounted at some suitable location on the aircraft. Should the aircraft crash, the switch in unit 38 closes and the transmitter begins operating in the manner just described.

With the transmitter operating at the radiofrequency mentioned, the transmitter's signals are readily receivable in substantially all conventional aircraft receivers. Such receivers are in relatively wide use, and are generally readily available. With the signals in each cycle transmitted at different maximum power levels, the signals tend to guide a searcher from a point remote to a point closely adjacent the site of the transmitter (and hence the downed aircraft).

More specifically, a searcher (typically in an aircraft) at a distance of about 50 miles from the transmitter will receive and hear the first two signals (such as signals 258, 260) in each cycle. The time spacing and audio modulation of these signals serve readily to identify them as distress signals. Should the searcher stop receiving these signals, he will know that he has moved away from the transmitter and must change his course. Within a relatively short time, it will become apparent from what general direction the signals come. As the searcher moves in this general direction and comes within about 25 miles of the transmitter, he will receive and hear the third signal (such as signal 262) in each cycle. On detecting this signal, and by following his position on a chart, the searcher will have a more precise idea as to the location of the transmitter, and can change his course (if necessary) accordingly.

When the searcher moves to within a distance of about 10 miles from the transmitter he will receive and hear the fourth signal (such as signal 264) of each cycle. When thus guided to such a close distance to the site of the downed aircraft, it will be a relatively simple matter to locate it exactly, either through visual observation, or through noting changes in the strengths of the signals received. The received signals will attain maximum strengths as the searcher approaches a point nearly directly over the transmitter.

Thus, it is evident that the invention obviates the need for conventional direction-finding equipment since it produces signals which, through changes in power level guide a searcher to the location of the transmitter. With the signals spaced apart in time by period of nontransmission, battery power energizing the transmitter is conserved. As a consequence, the period of time over which the transmitter may operate is extended. As an illustration, whereas a conventional distress signal transmitter energized with a given battery might be expected to operate for several hours, the transmitter of the present invention operating with the same battery might be expected to operate for a period of up to 2 weeks.

In the particular embodiment described, audio modulation in the signals, and the change in modulating rate described, tend to make the signals distinguishable and readily identifiable, Time separation of the signals also aids in their identification.

The various intervals, periods and frequencies described herein, of course, may be varied to adapt to different situations. In addition, there may be circumstances where audio modulation of the signals, or changing of the modulating rate, might be omitted. Also, provisions may be made for energizing the transmitter in some manner other than through the operation of an impact switching unit.

It is further appreciated that the transmitter may employ a wave generator other than a radiofrequency generator to adapt it to different situations. For example, a sonic wave generator for use in underwater applications might be employed.

Thus, while a preferred embodiment of the invention has been described herein, it is appreciated that variations and modifications may be made without departing from the spirit of the invention.

It is claimed and desired to secure my letters patent:

1. A transmitter comprising a pair of power input terminals adapted to be connected to a source of electrical energy an electrically energizable generator of propagatable waves operable when energized to generate such waves with the same having a maximum power level related to the amount of power supplied the generator, electronic gating means operatively interconnecting said generator and said power input terminals operable in recurrent cycles to supply power from said power input terminals to said generator during multiple time-spaced intervals, with the amount of power supplied the generator during at least two different intervals in a cycle of the gating means differing, and propagating means operatively connected to said generator for propagating waves generated thereby.

2. The transmitter of claim 1, wherein said gating means includes a modulator which, with power supplied said generator, modulates such supply of power at an audio rate.

3. The transmitter of claim 1, wherein said gating means includes a resistance-adjusting circuit actuatable to adjust to different selected values the total resistance through which power from said power input terminals is delivered to said generator, thus to adjust the amount of power supplied the generator, said resistance-adjusting circuit being constructed to adjust automatically such resistance to one selected value during one of said two different intervals in a cycle of the gating means, and to adjust such resistance to a different selected value during the other interval.

4. The transmitter of claim 3, wherein said gating means further includes a timing circuit for controlling the times during which power is supplied said generator.

5. The transmitter of claim 4, wherein said timing circuit comprises an electronic switch through which power is supplied to said generator operatively connected to one of said power input terminals, said switch having one state permitting the supply of power to said generator and another state blocking such supply, the periods of time that said switch occupies its said one state defining said previously mentioned intervals, and a chopper operatively connected to said switch operable to place the same alternately in its said one and other states.

6. The transmitter of claim 5, wherein said switch has an output side whose voltage changes with changes in the state of the switch and with said power-input terminals connected to a source of electrical energy, said resistance-adjusting circuit includes an input terminal operatively connected to said output side, and the resistance-adjusting circuit is actuated by a change in voltage on its said input terminal.

7. The transmitter of claim 5, wherein said timing circuit further comprises a modulator operatively interposed between said switch and said generator, operable with said switch in its said one state to modulate the supply of power to said generator at an audio rate.

8. The transmitter of claim 7, wherein said modulator comprises a rate-changing circuit operable automatically during modulation of the power supplied the generator to change the audio rate of such modulation.

9. The transmitter of claim 6, wherein said resistance-adjusting circuit comprises a pair of resistance units, each having a different resistance value, a different switch device for each resistance unit having one state connecting the unit into the circuit through which power is supplied said generator, and another state removing the unit from such circuit, and selector means responsive to voltage changes on the input terminal of said resistance-adjusting circuit and operable to adjust the states of said switching devices.

10. The transmitter of claim 6, wherein said gating means is constructed whereby in each of its said recurrent cycles it supplies power to said generator during at least three intervals, with the amounts of power supplied during the different intervals-differing, and said resistance-adjusting circuit is constructed to adjust to at least three different values the total resistance through which power from said power-input terminals is supplied to said generator.

11. The transmitter of claim 6, wherein said gating means is constructed whereby in each of its said recurrent cycles it supplies power to said generator during four intervals, with power at one maximum level being supplied during each of the first two of said intervals, power at another level being supplied during the third interval, and power at still another level being supplied during the fourth interval, and said resistance-adjusting circuit is constructed to adjust to at least three different values the total resistance through which power from said power-input terminals is supplied to said generator.

12. The transmitter of claim 11, wherein said resistance-adjusting circuit comprises first, second and third resistance units, each having a different resistance value for controlling the maximum level of power supplied said generator during said first two, third and fourth intervals, respectively, of a cycle of said gating means, a different switch device for each resistance unit having one state connecting the unit into the circuit through which power is supplied to said generator, and another state removing the unit from such circuit, and selector means responsive to voltage changes on the input terminal of said resistance-adjusting circuit and operable to adjust the states of said switch devices.

13. The transmitter of claim 2, wherein said modulator includes a rate-changing circuit operable automatically during modulation of the power supplied the generator to change the audio rate of such modulation.

14. The transmitter of claim 12, wherein, considering each recurrent cycle of said gating means, the maximum level of power supplied therethrough during the third interval in the cycle is less than that of power supplied during each of the first two intervals in the cycle and the maximum level of power supplied during the fourth interval in the cycle is less than that of power supplied during the third interval.

15. The transmitter of claim 1, wherein said generator is constructed to produce radiofrequency waves.

16. A transmitter comprising a pair of power input terminals adapted to be connected to a source of electrical energy, an electrically energizable generator of propagatable waves operable when energized to generate such waves with the same having a maximum power level related to the amount of power supplied the generator, electronic gating means operatively interconnecting said generator and said power input terminals operable in recurrent cycles to supply power from said power input terminals to said generator during multiple time-spaced intervals, with the amount of power supplied the generator during at least three different intervals in a cycle of the gating means differing, and propagating means operatively connected to said generator for propagating waves generated thereby.

17. The transmitter of claim 16, wherein said gating means includes a modulator which, with power supplied said generator, modulates such supply of power at an audio rate.

18. The transmitter of claim 17, wherein said modulator includes a rate-changing circuit operable automatically during modulation of the power supplied the generator to change the audio rate of such modulation.

* * * * *